United States Patent
Ibrahim et al.

(10) Patent No.: US 11,991,123 B2
(45) Date of Patent: May 21, 2024

(54) ADAPTIVE CODEBOOK CONFIGURATION FOR DYNAMIC TIME DIVISION DUPLEXING

(71) Applicant: QUALCOMM Incorporated, San Diego, CA (US)

(72) Inventors: Abdelrahman Mohamed Ahmed Mohamed Ibrahim, San Diego, CA (US); Muhammad Sayed Khairy Abdelghaffar, San Jose, CA (US); Ahmed Attia Abotabl, San Diego, CA (US); Wanshi Chen, San Diego, CA (US); Huilin Xu, Temecula, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 224 days.

(21) Appl. No.: 17/446,808

(22) Filed: Sep. 2, 2021

(65) Prior Publication Data

US 2023/0064591 A1  Mar. 2, 2023

(51) Int. Cl.
*H04W 72/00* (2023.01)
*H04B 7/0456* (2017.01)
*H04B 7/06* (2006.01)
*H04L 5/14* (2006.01)
*H04W 72/23* (2023.01)

(52) U.S. Cl.
CPC ............ *H04L 5/14* (2013.01); *H04B 7/0456* (2013.01); *H04B 7/0626* (2013.01); *H04W 72/23* (2023.01)

(58) Field of Classification Search
None
See application file for complete search history.

(56) References Cited

U.S. PATENT DOCUMENTS

| | | | |
|---|---|---|---|
| 2012/0020288 A1* | 1/2012 | Liu | H04L 1/0026 370/328 |
| 2013/0114763 A1* | 5/2013 | Park | H04B 7/0469 375/296 |
| 2016/0329937 A1* | 11/2016 | Shi | H04B 7/046 |
| 2018/0063693 A1* | 3/2018 | Chakraborty | H04W 8/005 |
| 2018/0183503 A1* | 6/2018 | Rahman | H04B 7/0645 |
| 2020/0186207 A1* | 6/2020 | Davydov | H04B 7/0469 |

(Continued)

FOREIGN PATENT DOCUMENTS

| | | |
|---|---|---|
| WO | 2017193331 A1 | 11/2017 |
| WO | WO2017193331 A1 * | 11/2017 ............ H04B 7/06 |

OTHER PUBLICATIONS

International Search Report and Written Opinion—PCT/US2022/075519—ISA/EPO—dated Nov. 14, 2022.

*Primary Examiner* — Abdelillah Elmejjarmi
(74) *Attorney, Agent, or Firm* — Harrity & Harrity, LLP

(57) ABSTRACT

Various aspects of the present disclosure generally relate to wireless communication. In some aspects, a user equipment (UE) may receive a configuration including a plurality of codebook subset restrictions. The UE may identify a codebook subset restriction, of the plurality of codebook subset restrictions, to be applied to precoding matrix indicator (PMI) selection associated with a slot. The UE may transmit a channel state information (CSI) report including an indication of a PMI selected based at least in part on the identified codebook subset restriction. Numerous other aspects are described.

30 Claims, 7 Drawing Sheets

(56) References Cited

U.S. PATENT DOCUMENTS

2020/0304178 A1* 9/2020 Wei .................. H04L 5/005
2021/0126681 A1 4/2021 Huang et al.
2021/0167824 A1* 6/2021 Faxér ............... H04B 7/0658
2022/0287059 A1* 9/2022 Huang .............. H04W 52/146

* cited by examiner

ADAPTIVE CODEBOOK CONFIGURATION FOR DYNAMIC TIME DIVISION DUPLEXING

FIELD OF THE DISCLOSURE

Aspects of the present disclosure generally relate to wireless communication and to techniques and apparatuses for adaptive codebook configuration for dynamic time division duplexing (TDD).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a UE. The method may include receiving a configuration including a plurality of codebook subset restrictions. The method may include identifying a codebook subset restriction, of the plurality of codebook subset restrictions, to be applied to precoding matrix indicator (PMI) selection associated with a slot. The method may include transmitting a channel state information (CSI) report including an indication of a PMI selected based at least in part on the identified codebook subset restriction.

Some aspects described herein relate to a method of wireless communication performed by a base station. The method may include transmitting a configuration including a plurality of codebook subset restrictions. The method may include receiving a CSI report including an indication of a PMI selected based at least in part on a codebook subset restriction of the plurality of codebook subset restrictions.

Some aspects described herein relate to a UE for wireless communication. The user equipment may include a memory and one or more processors coupled to the memory. The one or more processors may be configured to receive a configuration including a plurality of codebook subset restrictions. The one or more processors may be configured to identify a codebook subset restriction, of the plurality of codebook subset restrictions, to be applied to PMI selection associated with a slot. The one or more processors may be configured to transmit a CSI report including an indication of a PMI selected based at least in part on the identified codebook subset restriction.

Some aspects described herein relate to a base station for wireless communication. The base station may include a memory and one or more processors coupled to the memory. The one or more processors may be configured to transmit a configuration including a plurality of codebook subset restrictions. The one or more processors may be configured to receive a CSI report including an indication of a PMI selected based at least in part on a codebook subset restriction of the plurality of codebook subset restrictions.

Some aspects described herein relate to a non-transitory computer-readable medium that stores a set of instructions for wireless communication by a UE. The set of instructions, when executed by one or more processors of the UE, may cause the UE to receive a configuration including a plurality of codebook subset restrictions. The set of instructions, when executed by one or more processors of the UE, may cause the UE to identify a codebook subset restriction, of the plurality of codebook subset restrictions, to be applied to PMI selection associated with a slot. The set of instructions, when executed by one or more processors of the UE, may cause the UE to transmit a CSI report including an indication of a PMI selected based at least in part on the identified codebook subset restriction.

Some aspects described herein relate to a non-transitory computer-readable medium that stores a set of instructions for wireless communication by a base station. The set of instructions, when executed by one or more processors of the base station, may cause the base station to transmit a configuration including a plurality of codebook subset restrictions. The set of instructions, when executed by one or more processors of the base station, may cause the base station to receive a CSI report including an indication of a PMI selected based at least in part on a codebook subset restriction of the plurality of codebook subset restrictions.

Some aspects described herein relate to an apparatus for wireless communication. The apparatus may include means for receiving a configuration including a plurality of codebook subset restrictions. The apparatus may include means for identifying a codebook subset restriction, of the plurality of codebook subset restrictions, to be applied to PMI selection associated with a slot. The apparatus may include means for transmitting a CSI report including an indication of a PMI selected based at least in part on the identified codebook subset restriction.

Some aspects described herein relate to an apparatus for wireless communication. The apparatus may include means for transmitting a configuration including a plurality of codebook subset restrictions. The apparatus may include means for receiving a CSI report including an indication of a PMI selected based at least in part on a codebook subset restriction of the plurality of codebook subset restrictions.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
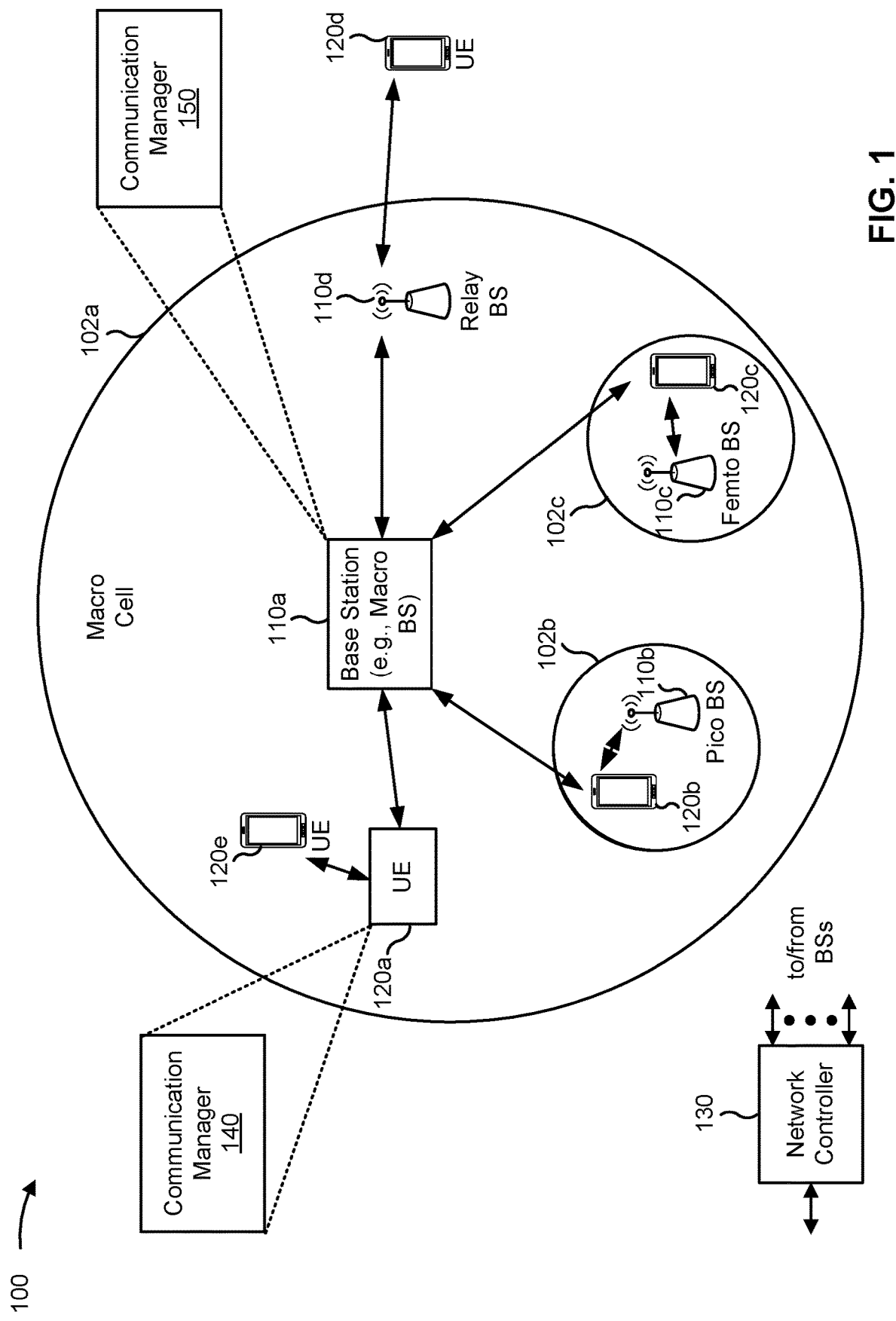
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a configuration including a plurality of codebook subset restrictions; identify a codebook subset restriction, of the plurality of codebook subset restrictions, to be applied to PMI selection associated with a slot; and transmit a CSI report including an indication of a PMI selected based at least in part on the identified codebook subset restriction. Additionally, or alternatively, the communication manager 140 may perform one or more other operations described herein.

In some aspects, the base station 110 may include a communication manager 150. As described in more detail elsewhere herein, the communication manager 150 may transmit a configuration including a plurality of codebook subset restrictions; and receive a CSI report including an indication of a PMI selected based at least in part on a codebook subset restriction of the plurality of codebook subset restrictions. Additionally, or alternatively, the communication manager 150 may perform one or more other operations described herein.

As indicated above, FIG. 1 is provided as an example. Other examples may differ from what is described with regard to FIG. 1.

Figure 2:
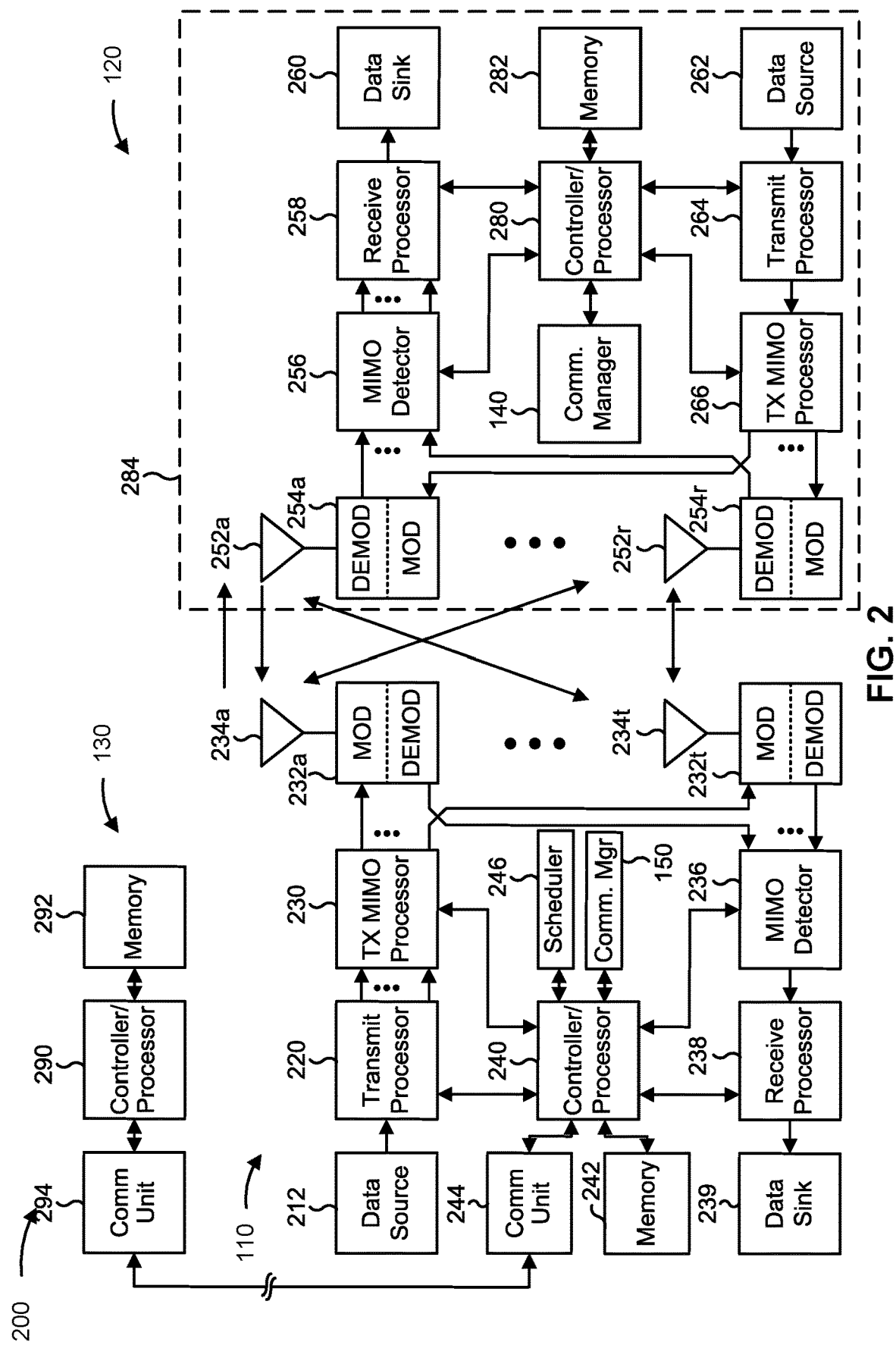
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-7).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-7).

The controller/processor 240 of the base station 110, the controller/processor 280 of the UE 120, and/or any other component(s) of FIG. 2 may perform one or more techniques associated with adaptive codebook configuration for dynamic TDD, as described in more detail elsewhere herein. For example, the controller/processor 240 of the base station 110, the controller/processor 280 of the UE 120, and/or any other component(s) of FIG. 2 may perform or direct operations of, for example, process 400 of FIG. 4, process 500 of FIG. 5, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 400 of FIG. 4, process 500 of FIG. 5, and/or other processes as described herein. In some examples, executing instructions may include running the instructions, converting the instructions, compiling the instructions, and/or interpreting the instructions, among other examples.

In some aspects, the UE includes means for receiving a configuration including a plurality of codebook subset restrictions; means for identifying a codebook subset restriction, of the plurality of codebook subset restrictions, to be applied to PMI selection associated with a slot; and/or means for transmitting a CSI report including an indication of a PMI selected based at least in part on the identified codebook subset restriction. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for transmitting a configuration including a plurality of codebook subset restrictions; and/or means for receiving a CSI report including an indication of a PMI selected based at least in part on a codebook subset restriction of the plurality of codebook subset restrictions. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

A scenario may occur in which two different time division duplex (TDD) wireless communication networks utilize the same frequency band (e.g., in the same channel or in adjacent channels). In such a scenario, cross link interference can occur when an uplink transmission in a first TDD network overlaps in time with (e.g., is communicated in a same slot as) a downlink transmission in a second TDD network. Notably, these types of interference causing transmissions occur in the case of asynchronous operation or semi-synchronous operation between the first and second TDD networks (e.g., when a TDD pattern in one or more slots can differ between the first TDD network and the second TDD network such that the direction of communication in a given slot may differ between the first TDD network and the second TDD network), but do not occur in the case of synchronous operation between the first and second TDD networks (e.g., when a TDD pattern matches such that the direction of communication in a given slot is the same in the first TDD network and the second TDD network).

Therefore, within all slots in asynchronous operation, or within flexible slots (e.g., slots that can be configured as an uplink slot or a downlink slot) in semi-synchronous operation, a base station in the first TDD network and a base station in the second TDD network can either communicate in the same traffic direction in a given slot (in which case there may be no interference) or communicate in different traffic directions in the given slot (in which case there may be high interference). For a base station in, for example, a first TDD network to receive an uplink transmission reliably, the base station needs to use either a dedicated uplink slot in the case of semi-synchronous operation with a second TDD network (e.g., a slot configured as an uplink slot in both the first and second TDD networks), which may suffer from long latency, or needs to use an uplink slot within which interference from the second TDD network is possible. In some systems, the base station may be permitted to opportunistically convert a downlink slot to an uplink slot (e.g., to reduce latency associated with an uplink communication). However, as a result of converting a downlink slot to an uplink slot, the uplink communication may suffer from high interference in the slot or cause interference in the slot. Similarly, in some cases, a full duplex capable base station can convert a downlink slot into a full duplex slot to enable simultaneous uplink reception and downlink transmission in the same frequency (e.g., in-band full duplex (IBFD)) or a sub-band (e.g., sub-band full duplex (SBFD)) of the slot. However, as a result of converting a downlink slot to a full duplex slot, the uplink communication may suffer from high interference in the slot or cause interference in the slot.

A similar issue occurs in the case of dynamic TDD to switch a downlink slot to an uplink slot or to a full-duplex slot. Here, the switching of a downlink slot to an uplink slot may reduce latency of an uplink communication, but the uplink communication might suffer from interference from a neighboring sector or may cause interference in a neighboring sector. For example, a base station in a first sector may switch a downlink slot to an uplink slot. However, a downlink transmission from a base station in a second (neighboring) sector may cause interference to uplink reception at the base station in the first sector. Here, pathloss may not be enough to lower interference between adjacent sectors, and the interference can occur due to main lobes or side lobes associated with the downlink transmission.

In general, as indicated above, a base station switching a direction of a slot in a TDD pattern or opportunistically switching a direction of a slot can be beneficial for, for example, reducing latency, improving network efficiency, or increasing a data rate. However, as noted above, the base station switching a slot in a manner described above can result in cross link interference to a neighboring base station or a neighboring sector.

Further, a UE may be configured to provide precoding matrix indicator (PMI) feedback (e.g., in a channel state information (CSI) report) in order to inform a base station of a precoding preferred by the UE for receiving downlink transmissions (e.g., on a physical downlink shared channel (PDSCH)). Generally, the base station sends a radio resource control (RRC) configuration to the UE that includes a codebook configuration including one or more parameters associated with PMI reporting. The one or more parameters may in some cases include a codebook subset restriction, which is used to limit a set of beams available for selection by the UE. That is, the codebook subset restriction may be used to identify a group of PMIs from which the UE can select a PMI for reporting to the base station, meaning that the codebook subset restriction can be used to limit the group of PMIs from which the UE can select a PMI for reporting to the base station. A similar concept can be applied in the context of integrated access and backhaul (IAB), whereby a parent IAB node can dynamically indicate to a child node a set of restricted beams at a distributed node (DU) of the child node.

Some techniques and apparatuses described herein provide for adaptive codebook configuration for dynamic TDD. In some aspects, a base station may transmit, and a UE may receive, a configuration including a plurality of codebook subset restrictions including a first codebook subset restriction that is to be applied to PMI selection in synchronous slots and a second codebook subset restriction that is to be applied to PMI selection in asynchronous slots. The UE may then identify a codebook subset restriction, of the plurality of codebook subset restrictions, to be applied to PMI selection associated with a slot. The UE may transmit, and the base station may receive, a CSI report including an indication of a PMI selected based at least in part on the identified codebook subset restriction. In this way, PMI selection may be performed so as account for dynamic TDD patterns and potential cross link interference in order to reduce a likelihood of cross link interference in a given slot. Additional details are provided below.

Figure 3:
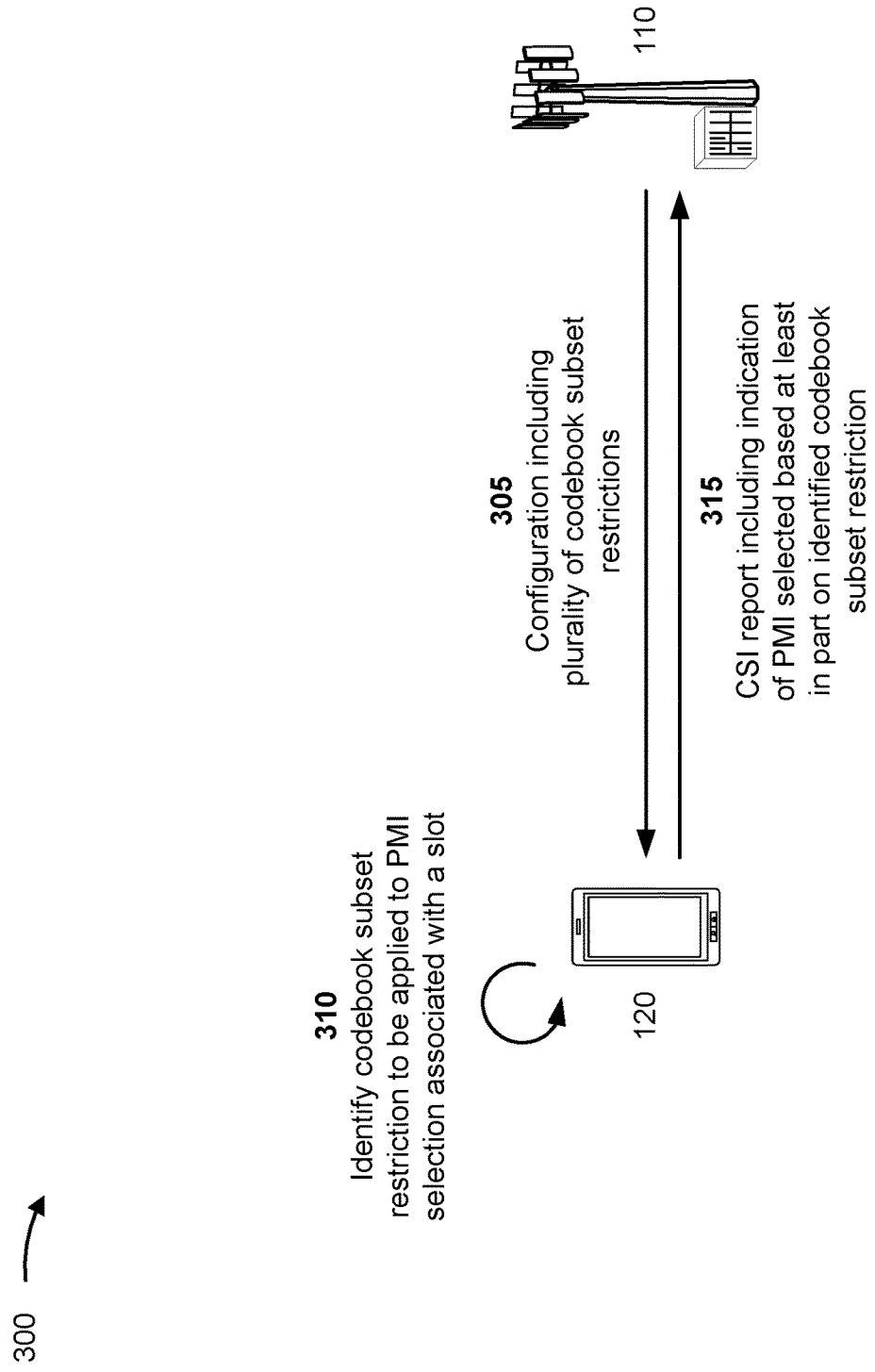
FIG. 3 is a diagram illustrating an example associated with adaptive codebook configuration for dynamic time TDD, in accordance with the present disclosure.

FIG. 3 is a diagram illustrating an example 300 associated with adaptive codebook configuration for dynamic TDD, in accordance with the present disclosure. As shown in FIG. 3, example 300 includes communication between a base station 110 and a UE 120. In some aspects, the base station 110 and UE 120 may be included in a wireless network, such as wireless network 100. The base station 110 and UE 120 may communicate via a wireless access link, which may include an uplink and a downlink.

As shown in FIG. 3 by reference 305, the base station 110 may transmit, and the UE 120 may receive, a configuration including a plurality of codebook subset restrictions. As described above, a codebook subset restriction may be a parameter that identifies a group of PMIs from which the UE 120 can select a PMI for reporting to the base station 110. In some aspects, as indicated above, the configuration includes at least two codebook subset restrictions (e.g., rather than a single codebook subset restriction). In some aspects, the configuration including the plurality of codebook subset restrictions may further include, for a given codebook subset restriction, an indication of a slot type to which the given codebook subset restriction is to be applied.

In some aspects, a first codebook subset restriction of the plurality of codebook subset restrictions is to be applied to PMI selection in synchronous slots. A synchronous slot is a slot in which a slot type (e.g., uplink, downlink, or flexible) identified TDD pattern configured for the UE 120 matches a slot type identified by another TDD pattern (e.g., a TDD pattern configured for another UE 120). For example, if a TDD pattern configured for the UE 120 identifies a given slot as a downlink slot, and another TDD pattern (e.g., to be used by another UE 120) also identifies the given slot as a downlink slot, then the slot is a synchronous slot. As another example, if a TDD pattern configured for the UE 120 identifies a given slot as an uplink slot, and another TDD pattern (e.g., to be used by another UE 120) also identifies the given slot as an uplink slot, then the slot is a synchronous slot.

In some aspects, a second codebook subset restriction of the plurality of codebook subset restrictions is to be applied to PMI selection in asynchronous slots. An asynchronous slot is a slot in which a slot type identified by a TDD pattern configured for the UE 120 does not match a slot type identified by another TDD pattern (e.g., a TDD pattern configured for another UE 120). For example, if a TDD pattern configured for the UE 120 identifies a given slot as a downlink slot, and another TDD pattern (e.g., to be used by another UE 120) identifies the given slot as an uplink slot, then the slot is an asynchronous slot. As another example, if a TDD pattern configured for the UE 120 identifies a given slot as an uplink slot, and another TDD pattern (e.g., to be used by another UE 120) identifies the given slot as a downlink slot, then the slot is an asynchronous slot.

As shown by reference 310, the UE 120 may identify a codebook subset restriction, of the plurality of codebook subset restrictions, to be applied to PMI selection associated with a slot. That is, the UE 120 may identify a codebook subset restriction that is be applied when selecting a PMI associated with a slot. In some aspects, the slot is a slot in which the UE 120 is to perform one or more measurements associated with generating, calculating, or otherwise determining CSI. That is, in some aspects, the slot is a slot in which the UE 120 is perform one or more measurements based at least in part on which the UE 120 is to select a PMI to report to the base station 110 (e.g., in a CSI report).

In some aspects, the UE 120 may identify the codebook subset restriction based at least in part on a determination of whether the slot is a synchronous slot or is an asynchronous slot. For example, the UE 120 may determine a slot type of the slot as identified by a TDD pattern configured on the UE 120, and may determine (e.g., based at least in part on information stored or accessible by the UE 120) a slot type of the slot as identified by another TDD pattern (e.g., associated with another UE 120). Here, by comparing the slot types indicated by the TDD patterns, the UE 120 can determine whether the slot is a synchronous slot or is an asynchronous slot, and may identify the codebook subset restriction to be applied accordingly.

In some aspects, the UE 120 may identify the codebook subset restriction based at least in part on a report quantity indicated in a configuration associated with the CSI report. For example, the base station 110 may configure the UE 120 with two types of PMI feedback reports in order to enable the UE 120 to report two PMIs (e.g., a report quantity cri-RI-PMI_sync-CQI for reporting a PMI to be used in synchronous slots, a report quantity cri-RI-PMI_async-CQI for reporting a PMI to be used in asynchronous slots). Here, the base station 110 may transmit, and the UE 120 may receive, a CSI report configuration indicating a report quantity associated with a CSI report, and the UE 120 may identify the codebook subset restriction based at least in part on the report quantity associated with the CSI report.

In some aspects, the UE 120 may identify the codebook subset restriction based at least in part on an indication of an activated codebook subset restriction. For example, the base station 110 may transmit, and the UE 120 may receive, an indication of an activated codebook subset restriction for the slot. Thus, the base station 110 can configure the UE 120 with the plurality of codebook subset restrictions, and may transmit an indication activating one of the plurality of codebook subset restrictions. In some aspects, the base station 110 may transmit, and the UE 120 may receive, the indication of the activated codebook subset restriction is in downlink control information (DCI) or a medium access control (MAC) control element. As a particular example, the base station 110 may transmit DCI triggering an aperiodic CSI report, where the DCI indicates which codebook subset restriction is to applied for PMI calculation for the aperiodic CSI report.

In some aspects, the UE 120 may identify the codebook subset restriction based at least in part on a bitmap associated with indicating activated codebook subset restrictions. For example, the base station 110 may transmit, and the UE 120 may receive, a bitmap indicating an activated (or deactivated) codebook subset restriction for each slot in a series of slots, and the UE 120 may identify the codebook subset restriction based at least in part on the bitmap (e.g., by identifying an activated codebook subset restriction for the slot using the bitmap). In some aspects, the base station 110 may transmit, and the UE 120 may receive, the bitmap in a MAC control element. In some aspects, the base station 110 may update the bitmap (e.g., after initial configuration of the bitmap) in a MAC control element.

In some aspects, the UE 120 may identify the codebook subset restriction based at least in part on a TDD pattern of a serving cell or sector of the UE 120 and a TDD pattern of a neighboring cell or sector of the UE 120. For example, the UE 120 may determine a slot type of the slot as identified by a TDD pattern configured on the UE 120, and may determine a slot type of the slot as identified by a TDD pattern associated with a neighboring cell. Here, by comparing the slot types indicated by the TDD patterns, the UE 120 can determine whether the slot is a synchronous slot or is an asynchronous slot, and may identify the codebook subset restriction to be applied accordingly.

In some aspects, the UE 120 may transmit, and the base station 110 may receive, UE capability information indicating whether the UE 120 supports functionality associated with adaptive codebook configuration as described herein. For example, the UE 120 may transmit, and the base station 110 may receive, UE capability information indicating whether the UE 120 supports configuration of multiple codebook subset restrictions, dynamic activation of codebook subset restrictions, dynamic indication of a type of a PMI report, or TDD bitmap mapping to codebook subset restrictions, among other examples.

As shown by reference 315, the UE 120 may transmit, and the base station 110 may receive, a CSI report including an indication of a PMI selected based at least in part on the identified codebook subset restriction. For example, the UE 120 may identify the codebook subset restriction, and may select a PMI based at least in part on the codebook subset restriction (e.g., after performing one or more CSI measurements). The UE 120 may then transmit, and the base station 110 may receive, a CSI report including the PMI selected by the UE 120 based at least in part on the identified codebook subset restriction.

In some aspects, the base station 110 may receive the CSI report transmitted by the UE 120, and may identify the PMI as being applicable to synchronous slots or to asynchronous slots. For example, the base station 110 may determine whether a slot associated with selection of the PMI indicated in the CSI report (e.g., a slot in which CSI measurements associated with the CSI report were performed) is a synchronous slot or is an asynchronous slot (e.g., based at least in part on a TDD pattern associated with the UE 120 and a TDD pattern associated with another UE 120), and may identify the PMI indicated by the CSI report as being applicable to synchronous slots or to asynchronous slots accordingly.

As indicated above, FIG. 3 is provided as an example. Other examples may differ from what is described with respect to FIG. 3.

Figure 4:
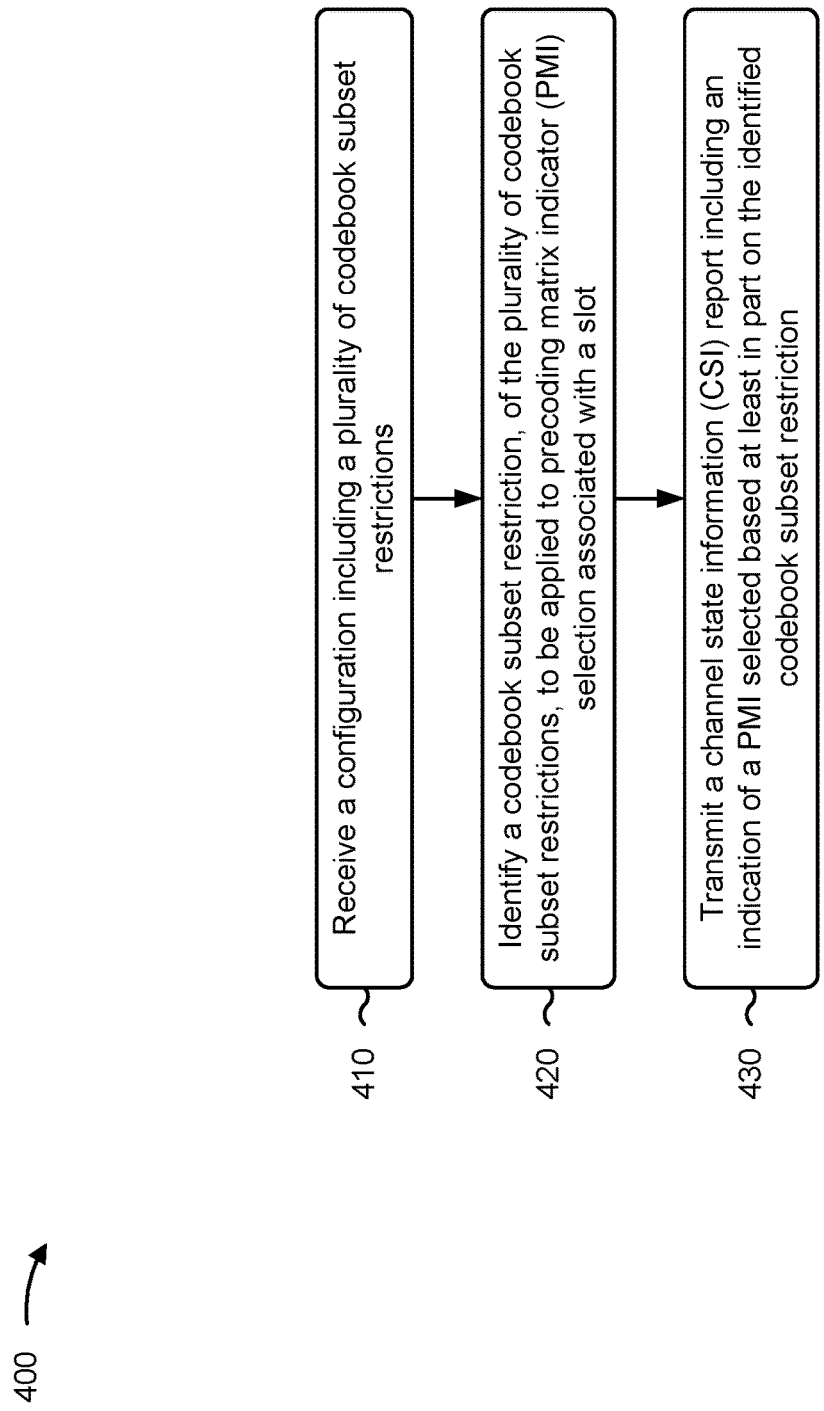
FIGS. 4 and 5 are diagrams illustrating example processes associated with adaptive codebook configuration for dynamic time TDD, in accordance with the present disclosure.

FIG. 4 is a diagram illustrating an example process 400 performed, for example, by a UE, in accordance with the present disclosure. Example process 400 is an example where the UE (e.g., UE 120) performs operations associated with adaptive codebook configuration for dynamic TDD.

As shown in FIG. 4, in some aspects, process 400 may include receiving a configuration including a plurality of codebook subset restrictions (block 410). For example, the UE (e.g., using communication manager 140 and/or reception component 602, depicted in FIG. 6) may receive a configuration including a plurality of codebook subset restrictions, as described above.

As further shown in FIG. 4, in some aspects, process 400 may include identifying a codebook subset restriction, of the plurality of codebook subset restrictions, to be applied to PMI selection associated with a slot (block 420). For example, the UE (e.g., using communication manager 140 and/or identification component 608, depicted in FIG. 6) may identify a codebook subset restriction, of the plurality of codebook subset restrictions, to be applied to PMI selection associated with a slot, as described above.

As further shown in FIG. 4, in some aspects, process 400 may include transmitting a CSI report including an indication of a PMI selected based at least in part on the identified codebook subset restriction (block 430). For example, the UE (e.g., using communication manager 140 and/or transmission component 604, depicted in FIG. 6) may transmit a CSI report including an indication of a PMI selected based at least in part on the identified codebook subset restriction, as described above.

Process 400 may include additional aspects, such as any single aspect or any combination of aspects described below and/or in connection with one or more other processes described elsewhere herein.

In a first aspect, a first codebook subset restriction of the plurality of codebook subset restrictions is to be applied to PMI selection in synchronous slots and a second codebook subset restriction of the plurality of codebook subset restrictions is to be applied to PMI selection in asynchronous slots.

In a second aspect, alone or in combination with the first aspect, the codebook subset restriction is identified based at least in part on a determination of whether the slot is a synchronous slot or is an asynchronous slot.

In a third aspect, alone or in combination with one or more of the first and second aspects, the codebook subset restriction is identified based at least in part on a report quantity indicated in a configuration associated with the CSI report.

In a fourth aspect, alone or in combination with one or more of the first through third aspects, the codebook subset restriction is identified based at least in part on an indication of an activated codebook subset restriction.

In a fifth aspect, alone or in combination with one or more of the first through fourth aspects, the indication of the activated codebook subset restriction is received in DCI or a MAC control element.

In a sixth aspect, alone or in combination with one or more of the first through fifth aspects, the codebook subset restriction is identified based at least in part on a bitmap associated with indicating activated codebook subset restrictions.

In a seventh aspect, alone or in combination with one or more of the first through sixth aspects, the bitmap associated with indicating the activated codebook subset restrictions is received or updated in a MAC control element.

In an eighth aspect, alone or in combination with one or more of the first through seventh aspects, the codebook subset restriction is identified based at least in part on a TDD pattern of a serving cell or sector of the UE and a TDD pattern of a neighboring cell or sector of the UE.

In a ninth aspect, alone or in combination with one or more of the first through eighth aspects, process 400 includes transmitting UE capability information indicating support of at least one of configuration of multiple codebook subset restrictions, dynamic activation of codebook subset restrictions, indication of a type of a PMI report, or TDD bitmap mapping to codebook subset restrictions.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
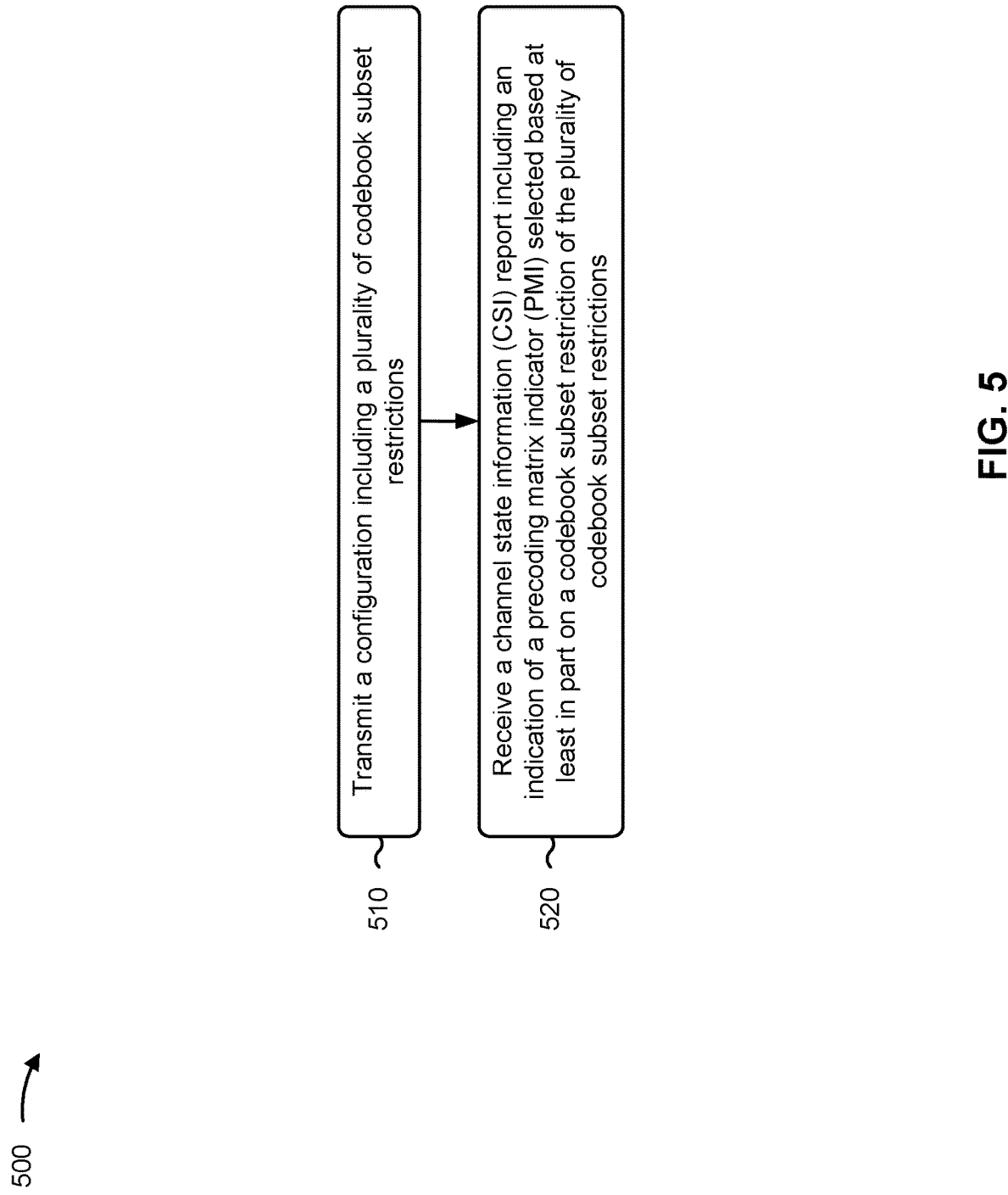

FIG. 5 is a diagram illustrating an example process 500 performed, for example, by a base station, in accordance with the present disclosure. Example process 500 is an example where the base station (e.g., base station 110) performs operations associated with adaptive codebook configuration for dynamic TDD.

As shown in FIG. 5, in some aspects, process 500 may include transmitting a configuration including a plurality of codebook subset restrictions (block 510). For example, the base station (e.g., using communication manager 150 and/or transmission component 704, depicted in FIG. 7) may transmit a configuration including a plurality of codebook subset restrictions, as described above.

As further shown in FIG. 5, in some aspects, process 500 may include receiving a CSI report including an indication of a PMI selected based at least in part on a codebook subset restriction of the plurality of codebook subset restrictions (block 520). For example, the base station (e.g., using communication manager 150 and/or reception component 702, depicted in FIG. 7) may receive a CSI report including an indication of a PMI selected based at least in part on a codebook subset restriction of the plurality of codebook subset restrictions, as described above.

Process 500 may include additional aspects, such as any single aspect or any combination of aspects described below and/or in connection with one or more other processes described elsewhere herein.

In a first aspect, a first codebook subset restriction of the plurality of codebook subset restrictions is to be applied to PMI selection in synchronous slots and a second codebook subset restriction of the plurality of codebook subset restrictions is to be applied to PMI selection in asynchronous slots.

In a second aspect, alone or in combination with the first aspect, process 500 includes identifying the PMI as being applicable to synchronous slots or to asynchronous slots based at least in part on a determination of whether a slot associated with selection of the PMI is a synchronous slot or is an asynchronous slot.

In a third aspect, alone or in combination with one or more of the first and second aspects, process 500 includes transmitting a configuration associated with the CSI report, the configuration including a report quantity indicating the codebook subset restriction.

In a fourth aspect, alone or in combination with one or more of the first through third aspects, process 500 includes transmitting an indication identifying the codebook subset restriction as an activated codebook subset restriction of the plurality of codebook subset restrictions.

In a fifth aspect, alone or in combination with one or more of the first through fourth aspects, the indication is transmitted in DCI.

In a sixth aspect, alone or in combination with one or more of the first through fifth aspects, process 500 includes transmitting a bitmap associated with indicating activated codebook subset restrictions, the bitmap indicating the codebook subset restriction as the activated codebook subset restriction for a slot associated with selection of the PMI.

In a seventh aspect, alone or in combination with one or more of the first through sixth aspects, the bitmap associated with indicating activated codebook subset restrictions is transmitted in a MAC control element.

In an eighth aspect, alone or in combination with one or more of the first through seventh aspects, process 500 includes receiving UE capability information indicating support of at least one of configuration of multiple codebook subset restrictions, dynamic activation of codebook subset restrictions, indication of a type of a PMI report, or TDD bitmap mapping to codebook subset restrictions.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
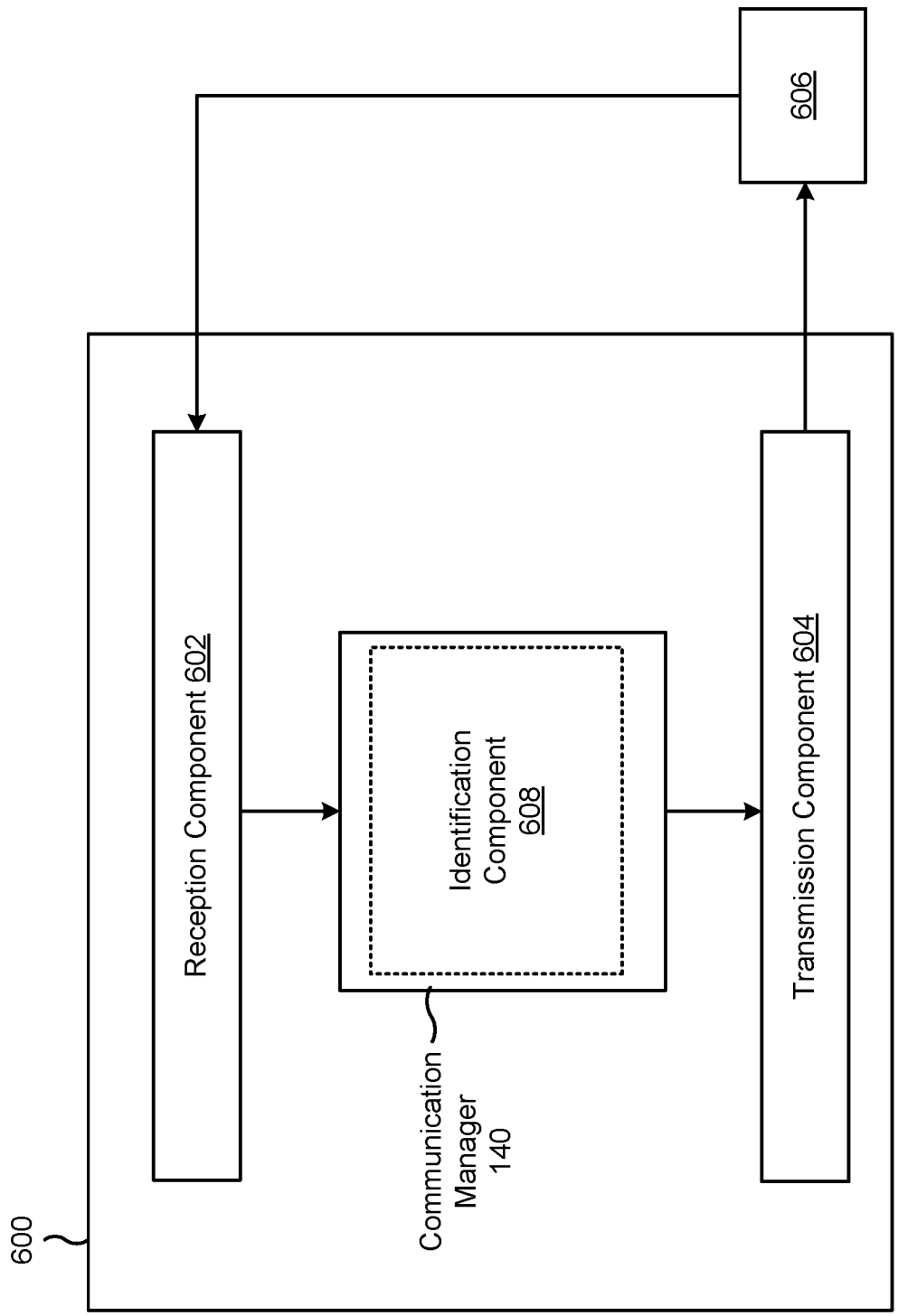
FIGS. 6 and 7 are diagrams of example apparatuses for wireless communication, in accordance with the present disclosure.

FIG. 6 is a diagram of an example apparatus 600 for wireless communication. The apparatus 600 may be a UE, or a UE may include the apparatus 600. In some aspects, the apparatus 600 includes a reception component 602 and a transmission component 604, which may be in communication with one another (for example, via one or more buses and/or one or more other components). As shown, the apparatus 600 may communicate with another apparatus 606 (such as a UE, a base station, or another wireless communication device) using the reception component 602 and the transmission component 604. As further shown, the apparatus 600 may include the communication manager 140. The communication manager 140 may include an identification component 608, among other examples.

In some aspects, the apparatus 600 may be configured to perform one or more operations described herein in connection with FIG. 3. Additionally, or alternatively, the apparatus 600 may be configured to perform one or more processes described herein, such as process 400 of FIG. 4, or a combination thereof. In some aspects, the apparatus 600 and/or one or more components shown in FIG. 6 may include one or more components of the UE described in connection with FIG. 2. Additionally, or alternatively, one or more components shown in FIG. 6 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 602 may receive communications, such as reference signals, control information, data communications, or a combination thereof, from the apparatus 606. The reception component 602 may provide received communications to one or more other components of the apparatus 600. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 600. In some aspects, the reception component 602 may include one or more antennas, a modem, a demodulator, a MIMO detector, a receive processor, a controller/processor, a memory, or a combination thereof, of the UE described in connection with FIG. 2.

The transmission component 604 may transmit communications, such as reference signals, control information, data communications, or a combination thereof, to the apparatus 606. In some aspects, one or more other components of the apparatus 600 may generate communications and may provide the generated communications to the transmission component 604 for transmission to the apparatus 606. In some aspects, the transmission component 604 may perform signal processing on the generated communications (such as filtering, amplification, modulation, digital-to-analog conversion, multiplexing, interleaving, mapping, or encoding, among other examples), and may transmit the processed signals to the apparatus 606. In some aspects, the transmission component 604 may include one or more antennas, a modem, a modulator, a transmit MIMO processor, a transmit processor, a controller/processor, a memory, or a combination thereof, of the UE described in connection with FIG. 2. In some aspects, the transmission component 604 may be co-located with the reception component 602 in a transceiver.

The reception component 602 may receive a configuration including a plurality of codebook subset restrictions. The identification component 608 may identify a codebook subset restriction, of the plurality of codebook subset restrictions, to be applied to PMI selection associated with a slot. The transmission component 604 may transmit a CSI report including an indication of a PMI selected based at least in part on the identified codebook subset restriction.

The transmission component 604 may transmit UE capability information indicating support of at least one of configuration of multiple codebook subset restrictions, dynamic activation of codebook subset restrictions, dynamic indication of a type of a PMI report, or TDD bitmap mapping to codebook subset restrictions.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of (one or more) components shown in FIG. 6 may perform one or more functions described as being performed by another set of components shown in FIG. 6.

Figure 7:
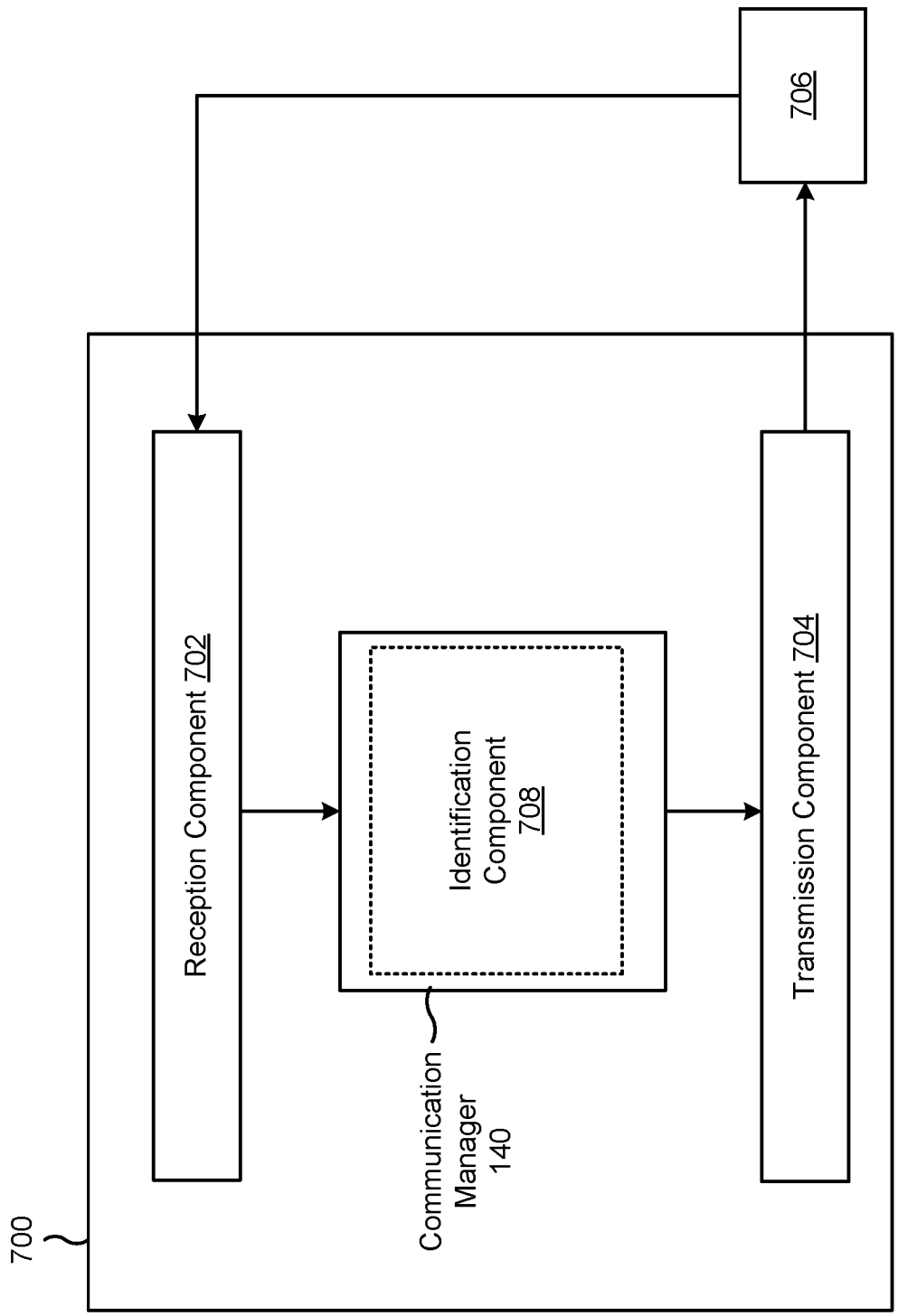

FIG. 7 is a diagram of an example apparatus 700 for wireless communication. The apparatus 700 may be a base station, or a base station may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include the communication manager 150. The communication manager 150 may include an identification component 708, among other examples.

In some aspects, the apparatus 700 may be configured to perform one or more operations described herein in connection with FIG. 3. Additionally, or alternatively, the apparatus 700 may be configured to perform one or more processes described herein, such as process 500 of FIG. 5, or a combination thereof. In some aspects, the apparatus 700 and/or one or more components shown in FIG. 7 may include one or more components of the base station described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, a modem, a demodulator, a MIMO detector, a receive processor, a controller/processor, a memory, or a combination thereof, of the base station described in connection with FIG. 2.

The transmission component 704 may transmit communications, such as reference signals, control information, data communications, or a combination thereof, to the apparatus 706. In some aspects, one or more other components of the apparatus 700 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the base station described in connection with FIG. 2. In some aspects, the transmission component 704 may be co-located with the reception component 702 in a transceiver.

The transmission component 704 may transmit a configuration including a plurality of codebook subset restrictions. The reception component 702 may receive a CSI report including an indication of a PMI selected based at least in part on a codebook subset restriction of the plurality of codebook subset restrictions.

The identification component 708 may identify the PMI as being applicable to synchronous slots or to asynchronous slots based at least in part on a determination of whether a slot associated with selection of the PMI is a synchronous slot or is an asynchronous slot.

The transmission component 704 may transmit a configuration associated with the CSI report, the configuration including a report quantity indicating the codebook subset restriction.

The transmission component 704 may transmit an indication identifying the codebook subset restriction as an activated codebook subset restriction of the plurality of codebook subset restrictions.

The transmission component 704 may transmit a bitmap associated with indicating activated codebook subset restrictions, the bitmap indicating the codebook subset restriction as the activated codebook subset restriction for a slot associated with selection of the PMI.

The reception component 702 may receive UE capability information indicating support of at least one of configuration of multiple codebook subset restrictions, dynamic activation of codebook subset restrictions, dynamic indication of a type of a PMI report, or TDD bitmap mapping to codebook subset restrictions.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The following provides an overview of some Aspects of the present disclosure:

Aspect 1: A method of wireless communication performed by a UE, comprising: receiving a configuration including a plurality of codebook subset restrictions; identifying a codebook subset restriction, of the plurality of codebook subset restrictions, to be applied to PMI selection associated with a slot; and transmitting a CSI report including an indication of a PMI selected based at least in part on the identified codebook subset restriction.

Aspect 2: The method of Aspect 1, wherein a first codebook subset restriction of the plurality of codebook subset restrictions is to be applied to PMI selection in synchronous slots and a second codebook subset restriction of the plurality of codebook subset restrictions is to be applied to PMI selection in asynchronous slots.

Aspect 3: The method of any of Aspects 1-2, wherein the codebook subset restriction is identified based at least in part on a determination of whether the slot is a synchronous slot or is an asynchronous slot.

Aspect 4: The method any of Aspects 1-3, wherein the codebook subset restriction is identified based at least in part on a report quantity indicated in a configuration associated with the CSI report.

Aspect 5: The method of any of Aspects 1-3, wherein the codebook subset restriction is identified based at least in part on an indication of an activated codebook subset restriction.

Aspect 6: The method of Aspect 5, wherein the indication of the activated codebook subset restriction is received in DCI or a MAC control element.

Aspect 7: The method of any of Aspects 1-6, wherein the codebook subset restriction is identified based at least in part on a bitmap associated with indicating activated codebook subset restrictions.

Aspect 8: The method of Aspect 7, wherein the bitmap associated with indicating the activated codebook subset restrictions is received or updated in a MAC control element.

Aspect 9: The method of any of Aspects 1-8, wherein the codebook subset restriction is identified based at least in part on a TDD pattern of a serving cell or sector of the UE and a TDD pattern of a neighboring cell or sector of the UE.

Aspect 10: The method of any of Aspects 1-9, further comprising transmitting UE capability information indicating support of at least one of: configuration of multiple codebook subset restrictions, dynamic activation of codebook subset restrictions, dynamic indication of a type of a PMI report, or TDD bitmap mapping to codebook subset restrictions.

Aspect 11: A method of wireless communication performed by a base station, comprising: transmitting a configuration including a plurality of codebook subset restrictions; and receiving a CSI report including an indication of a PMI selected based at least in part on a codebook subset restriction of the plurality of codebook subset restrictions.

Aspect 12: The method of Aspect 11, wherein a first codebook subset restriction of the plurality of codebook subset restrictions is to be applied to PMI selection in synchronous slots and a second codebook subset restriction of the plurality of codebook subset restrictions is to be applied to PMI selection in asynchronous slots.

Aspect 13: The method of any of Aspects 11-12, further comprising identifying the PMI as being applicable to synchronous slots or to asynchronous slots based at least in part on a determination of whether a slot associated with selection of the PMI is a synchronous slot or is an asynchronous slot.

Aspect 14: The method of any of Aspects 11-13, further comprising transmitting a configuration associated with the CSI report, the configuration including a report quantity indicating the codebook subset restriction.

Aspect 15: The method of any of Aspects 11-14, further comprising transmitting an indication identifying the codebook subset restriction as an activated codebook subset restriction of the plurality of codebook subset restrictions.

Aspect 16: The method of Aspect 15, wherein the indication is transmitted in DCI.

Aspect 17: The method of any of Aspects 11-16, further comprising transmitting a bitmap associated with indicating activated codebook subset restrictions, the bitmap indicating the codebook subset restriction as the activated codebook subset restriction for a slot associated with selection of the PMI.

Aspect 18: The method of Aspect 17, wherein the bitmap associated with indicating activated codebook subset restrictions is transmitted in a MAC control element.

Aspect 19: The method of any of Aspects 11-18, further comprising receiving UE capability information indicating support of at least one of: configuration of multiple codebook subset restrictions, dynamic activation of codebook subset restrictions, dynamic indication of a type of a PMI report, or TDD bitmap mapping to codebook subset restrictions.

Aspect 20: An apparatus for wireless communication at a device, comprising a processor; memory coupled with the processor; and instructions stored in the memory and executable by the processor to cause the apparatus to perform the method of one or more of Aspects 1-10.

Aspect 21: A device for wireless communication, comprising a memory and one or more processors coupled to the memory, the one or more processors configured to perform the method of one or more of Aspects 1-10.

Aspect 22: An apparatus for wireless communication, comprising at least one means for performing the method of one or more of Aspects 1-10.

Aspect 23: A non-transitory computer-readable medium storing code for wireless communication, the code comprising instructions executable by a processor to perform the method of one or more of Aspects 1-10.

Aspect 24: A non-transitory computer-readable medium storing a set of instructions for wireless communication, the set of instructions comprising one or more instructions that, when executed by one or more processors of a device, cause the device to perform the method of one or more of Aspects 1-10.

Aspect 25: An apparatus for wireless communication at a device, comprising a processor; memory coupled with the processor; and instructions stored in the memory and executable by the processor to cause the apparatus to perform the method of one or more of Aspects 11-19.

Aspect 26: A device for wireless communication, comprising a memory and one or more processors coupled to the memory, the one or more processors configured to perform the method of one or more of Aspects 11-19.

Aspect 27: An apparatus for wireless communication, comprising at least one means for performing the method of one or more of Aspects 11-19.

Aspect 28: A non-transitory computer-readable medium storing code for wireless communication, the code comprising instructions executable by a processor to perform the method of one or more of Aspects 11-19.

Aspect 29: A non-transitory computer-readable medium storing a set of instructions for wireless communication, the set of instructions comprising one or more instructions that, when executed by one or more processors of a device, cause the device to perform the method of one or more of Aspects 11-19.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
one or more memories; and
one or more processors, coupled to the one or more memories, configured to:
receive a configuration including a plurality of codebook subset restrictions and including, for a given codebook subset restriction of the plurality of codebook subset restrictions, an indication of a slot type to which the given codebook subset restriction applies,
wherein the slot type corresponds to a synchronous slot or an asynchronous slot;
identify a codebook subset restriction, of the plurality of codebook subset restrictions, to be applied to precoding matrix indicator (PMI) selection associated with a slot; and
transmit a channel state information (CSI) report including an indication of a PMI selected based at least in part on the codebook subset restriction.

2. The UE of claim 1, wherein a first codebook subset restriction of the plurality of codebook subset restrictions is to be applied to PMI selection in synchronous slots and a second codebook subset restriction of the plurality of codebook subset restrictions is to be applied to PMI selection in asynchronous slots.

3. The UE of claim 1, wherein the codebook subset restriction is identified based at least in part on a determination of whether the slot is a synchronous slot or is an asynchronous slot.

4. The UE of claim 1, wherein the codebook subset restriction is identified based at least in part on a report quantity indicated in a configuration associated with the CSI report.

5. The UE of claim 1, wherein the codebook subset restriction is identified based at least in part on an indication of an activated codebook subset restriction.

6. The UE of claim 5, wherein the indication of the activated codebook subset restriction is received in downlink control information (DCI) or a medium access control (MAC) control element.

7. The UE of claim 1, wherein the codebook subset restriction is identified based at least in part on a bitmap associated with indicating activated codebook subset restrictions.

8. The UE of claim 7, wherein the bitmap associated with indicating the activated codebook subset restrictions is received or updated in a medium access control (MAC) control element.

9. The UE of claim 1, wherein the codebook subset restriction is identified based at least in part on a time division duplex (TDD) pattern of a serving cell or sector of the UE and a TDD pattern of a neighboring cell or sector of the UE.

10. The UE of claim 1, wherein the one or more processors are further configured to transmit UE capability information indicating support of at least one of:
configuration of multiple codebook subset restrictions,
dynamic activation of codebook subset restrictions,
dynamic indication of a type of a PMI report, or
time division duplex (TDD) bitmap mapping to codebook subset restrictions.

11. A base station for wireless communication, comprising:
one or more memories; and
one or more processors, coupled to the one or more memories, configured to:
transmit a configuration including a plurality of codebook subset restrictions and including, for a given codebook subset restriction of the plurality of codebook subset restrictions, an indication of a slot type to which the given codebook subset restriction applies, wherein the slot type corresponds to a synchronous slot or an asynchronous slot; and receive a channel state information (CSI) report including an indication of a precoding matrix indicator (PMI) selected based at least in part on a codebook subset restriction of the plurality of codebook subset restrictions.

12. The base station of claim 11, wherein a first codebook subset restriction of the plurality of codebook subset restrictions is to be applied to PMI selection in synchronous slots and a second codebook subset restriction of the plurality of codebook subset restrictions is to be applied to PMI selection in asynchronous slots.

13. The base station of claim 11, wherein the one or more processors are further configured to identify the PMI as being applicable to synchronous slots or to asynchronous slots based at least in part on a determination of whether a slot associated with selection of the PMI is a synchronous slot or is an asynchronous slot.

14. The base station of claim 11, wherein the one or more processors are further configured to transmit a configuration associated with the CSI report, the configuration including a report quantity indicating the codebook subset restriction.

15. The base station of claim 11, wherein the one or more processors are further configured to transmit an indication identifying the codebook subset restriction as an activated codebook subset restriction of the plurality of codebook subset restrictions.

16. The base station of claim 15, wherein the indication is transmitted in downlink control information (DCI).

17. The base station of claim 11, wherein the one or more processors are further configured to transmit a bitmap associated with indicating activated codebook subset restrictions, the bitmap indicating the codebook subset restriction as an activated codebook subset restriction for a slot associated with selection of the PMI.

18. The base station of claim 17, wherein the bitmap associated with indicating activated codebook subset restrictions is transmitted in a medium access control (MAC) control element.

19. The base station of claim 11, wherein the one or more processors are further configured to receive UE capability information indicating support of at least one of:
configuration of multiple codebook subset restrictions,
dynamic activation of codebook subset restrictions,
dynamic indication of a type of a PMI report, or
time division duplex (TDD) bitmap mapping to codebook subset restrictions.

20. A method of wireless communication performed by a user equipment (UE), comprising:
receiving a configuration including a plurality of codebook subset restrictions and including, for a given codebook subset restriction of the plurality of codebook subset restrictions, an indication of a slot type to which the given codebook subset restriction applies,
wherein the slot type corresponds to a synchronous slot or an asynchronous slot;

identifying a codebook subset restriction, of the plurality of codebook subset restrictions, to be applied to precoding matrix indicator (PMI) selection associated with a slot; and
transmitting a channel state information (CSI) report including an indication of a PMI selected based at least in part on the codebook subset restriction.

21. The method of claim 20, wherein a first codebook subset restriction of the plurality of codebook subset restrictions is to be applied to PMI selection in synchronous slots and a second codebook subset restriction of the plurality of codebook subset restrictions is to be applied to PMI selection in asynchronous slots.

22. The method of claim 20, wherein the codebook subset restriction is identified based at least in part on a determination of whether the slot is a synchronous slot or is an asynchronous slot.

23. The method of claim 20, wherein the codebook subset restriction is identified based at least in part on a report quantity indicated in a configuration associated with the CSI report.

24. The method of claim 20, wherein the codebook subset restriction is identified based at least in part on an indication of an activated codebook subset restriction.

25. The method of claim 24, wherein the indication of the activated codebook subset restriction is received in downlink control information (DCI) or a medium access control (MAC) control element.

26. The method of claim 20, wherein the codebook subset restriction is identified based at least in part on a bitmap associated with indicating activated codebook subset restrictions.

27. The method of claim 26, wherein the bitmap associated with indicating the activated codebook subset restrictions is received or updated in a medium access control (MAC) control element.

28. The method of claim 20, wherein the codebook subset restriction is identified based at least in part on a time division duplex (TDD) pattern of a serving cell or sector of the UE and a TDD pattern of a neighboring cell or sector of the UE.

29. The method of claim 20, further comprising transmitting UE capability information indicating support of at least one of:
configuration of multiple codebook subset restrictions,
dynamic activation of codebook subset restrictions,
dynamic indication of a type of a PMI report, or
time division duplex (TDD) bitmap mapping to codebook subset restrictions.

30. A method of wireless communication performed by a base station, comprising:
transmitting a configuration including a plurality of codebook subset restrictions and including, for a given codebook subset restriction of the plurality of codebook subset restrictions, an indication of a slot type to which the given codebook subset restriction applies,
wherein the slot type corresponds to a synchronous slot or an asynchronous slot; and
receiving a channel state information (CSI) report including an indication of a precoding matrix indicator (PMI) selected based at least in part on a codebook subset restriction of the plurality of codebook subset restrictions.

* * * * *